United States Patent
Nakamura (10) Patent No.: US 9,516,230 B2
(45) Date of Patent: Dec. 6, 2016

(54) MEDICAL IMAGE RECORDING/PLAYBACK DEVICE

(71) Applicants: Shoichi Nakamura, Nagano (JP); ACP JAPAN CO., LTD., Tokyo (JP)

(72) Inventor: Shoichi Nakamura, Nagano (JP)

(73) Assignees: ACP JAPAN CO., LTD., Tokyo (JP); Shoichi Nakamura, Higashichikuma-gun, Nagano (JP)

(*) Notice: Subject to any disclaimer, the term of this patent is extended or adjusted under 35 U.S.C. 154(b) by 0 days.

(21) Appl. No.: 14/891,993

(22) PCT Filed: Apr. 16, 2014

(86) PCT No.: PCT/JP2014/060772
§ 371 (c)(1),
(2) Date: Nov. 18, 2015

(87) PCT Pub. No.: WO2014/188821
PCT Pub. Date: Nov. 27, 2014

(65) Prior Publication Data
US 2016/0094789 A1    Mar. 31, 2016

(30) Foreign Application Priority Data

May 20, 2013 (JP) ................... 2013-106011
Sep. 17, 2013 (JP) ................... 2013-191661

(51) Int. Cl.
*H04N 5/232* (2006.01)
*H04N 5/77* (2006.01)
(Continued)

(52) U.S. Cl.
CPC ........... *H04N 5/23267* (2013.01); *G11B 19/20* (2013.01); *H04N 5/232* (2013.01);
(Continued)

(58) Field of Classification Search
CPC  H04N 5/232; H04N 5/23258; H04N 5/23245; H04N 19/142; H04N 2201/0089
See application file for complete search history.

(56) References Cited

U.S. PATENT DOCUMENTS

| 6,014,169 A  * | 1/2000 | Azusawa ................. G03B 5/00 |
| | | 348/208.8 |
| 2002/0131504 A1* | 9/2002 | Inou ....................... H04N 7/183 |
| | | 375/240.17 |

(Continued)

FOREIGN PATENT DOCUMENTS

| JP | S63-102378 U | 7/1988 |
| JP | 2002-171469 A | 6/2002 |

(Continued)

OTHER PUBLICATIONS

PCT, "International Search Report for International Application No. PCT/JP2014/060772".

*Primary Examiner* — Hung Dang
*Assistant Examiner* — Sunghyoun Park
(74) *Attorney, Agent, or Firm* — Manabu Kanesaka (57) ABSTRACT

A medical image recording/playback device includes an image pickup device. In an image pickup device that generates an image pickup signal by photoelectrically converting light reflected from a subject through an image pickup element, an image pickup control unit displays, on a display unit, image data that is generated for each of frames that constitute a video by processing the image pickup signal, and records the image data on a memory card. When the video is played, an image shift detection unit sequentially compares image data between consecutive or adjacent frames read from the memory card, and detects an amount of positional shift of a main subject between the frames. If the amount of positional shift is greater than or equal to a (Continued)

preset threshold value, displaying of the image data read from the memory card is stopped.

5 Claims, 7 Drawing Sheets

(51) Int. Cl.
*G11B 19/20* (2006.01)
*H04N 5/91* (2006.01)
*H04N 9/82* (2006.01)

(52) U.S. Cl.
CPC ..... *H04N 5/23241* (2013.01); *H04N 5/23254* (2013.01); *H04N 5/23258* (2013.01); *H04N 5/23264* (2013.01); *H04N 5/772* (2013.01); *H04N 5/91* (2013.01); *H04N 9/8205* (2013.01)

(56) References Cited

U.S. PATENT DOCUMENTS

| | | | | |
|---|---|---|---|---|
| 2003/0142209 A1* | 7/2003 | Yamazaki | ............... | H04N 7/188 348/143 |
| 2005/0088540 A1* | 4/2005 | Sudo | ........................ | A61B 1/04 348/231.99 |
| 2007/0177859 A1* | 8/2007 | Ito | ........................ | G11B 19/04 396/55 |
| 2008/0136940 A1* | 6/2008 | Srikanth | ............ | H04N 1/00307 348/231.99 |
| 2008/0260348 A1* | 10/2008 | Maeda | ................. | G11B 27/034 386/279 |
| 2009/0073304 A1* | 3/2009 | Kumagai | ............... | G03B 13/30 348/345 |
| 2009/0290846 A1* | 11/2009 | Won | ......................... | G06T 7/20 386/353 |
| 2010/0023599 A1* | 1/2010 | Azuma | ................. | H04N 5/4403 709/217 |
| 2010/0208121 A1* | 8/2010 | Kato | .................... | G02B 27/017 348/333.07 |

FOREIGN PATENT DOCUMENTS

| | | |
|---|---|---|
| JP | 2003-032607 A | 1/2003 |
| JP | 2003-204972 A | 7/2003 |
| JP | 2005-348178 A | 12/2005 |
| JP | 2008-288829 A | 11/2008 |
| JP | 2009-077265 A | 4/2009 |
| JP | 2009-098570 A | 5/2009 |

* cited by examiner

MEDICAL IMAGE RECORDING/PLAYBACK DEVICE

RELATED APPLICATIONS

The present application is National Phase of International Application No. PCT/JP2014/060772 filed Apr. 16, 2014, and claim priorities from Japanese Applications No. 2013-106011, filed May 20, 2013; and No. 2013-191661, filed Sep. 17, 2013, the disclosure of which is hereby incorporated by reference herein in its entirety.

The present invention relates to a medical image recording/playback device that takes pictures of treatment during medical treatment in order to record, and display a recorded video.

Putting an image pickup device, such as a digital video camera equipped with image pickup elements of CCD or CMOS type, on the body of an operator who carries out an operation in order to shoot a video of how the operation is going is a common practice.

In particular, in the field of medical treatment, if a video of how an operator has conducted an operation on a treatment target location is taken and left as a record, the video will be highly useful as explanatory material when a person who got the treatment or his/her family receives an explanation of how the operation is conducted after the operation, or as material for academic conferences or medical education.

In order to meet such needs, what is known is a medical image pickup device whose image pickup device is attached to a binocular loupe or headband that an operator puts on his/her head or face when conducting an operation, enabling the image pickup device to shoot a treatment target location the operator is closely watching (Refer to Patent Documents 1 and 2, for example).

However, when the image pickup device is used to shoot a subject within an image pickup range, so-called "camera shake" is a problem. The "camera shake" means that the movement of the body or head of the operator shakes the image pickup device during medical treatment, causing the video to blur. Delicate work, such as medical treatment, entails wiggling of hands. If the image pickup device that is put on the body of the operator moves when a shutter is being opened, the movement causes the video to blur, thereby making the video unclear.

In order to suppress such a "camera shake," it is known that a digital camera makes a correction in accordance with an amount of camera shake detected by an angular velocity sensor in order to correct (Refer to Patent Document 3, for example).

However, in the case of an image pickup recording/playback device that leaves an image pickup result as a record, besides blurred images caused by a "camera shake" or the like, the video becomes inappropriate as a record video once a subject that should be shot and left as a record, goes out of a shooting target. That is, in the case of a medical image pickup device that is put on the head or face of an operator to shoot a treatment target location that the operator is closely watching during medical treatment, for example, if the operator turns his/her face away from the treatment target location as the operator gives a treatment assistant instructions or the like during the treatment or the operator slightly moves his/her body to relax during a long medical treatment time, the image pickup device takes an image of locations other than where the treatment is carried out, and the record video becomes defective as the record video contains that image. In this case, it is annoying for the operator to operate a release switch for video shooting each time the treatment, is suspended. It is also difficult for the operator to do the operation because the blood or body fluid of a patient adheres to his/her hands and fingers.

Moreover, what is known is a video recording/playback device that includes shake detection means for detecting a degree of shaking of a main body of the device during shooting of video: the degree of shaking detected by the shake detection means and video data sure together recorded on a recording device; when the video data recorded on the recording device is played, the degree of shaking that is read together with the video data is compared with a predetermined value; if the degree of shaking is greater than the predetermined value as a result of the comparison, the displaying of the video based on the video data that is read together with the degree of shaking is stopped (Refer to Patent Document 4, for example).

PRIOR ART DOCUMENTS

Patent Documents

[Patent Document 1] Japanese Patent Application Laid-Open Publication No. 2003-204972

[Patent Document 2] Japanese Patent Application Laid-Open Publication No. 2009-98570

[Patent Document 3] Japanese Patent Application Laid-Open Publication No. 2009-77265

[Patent Document 4] Japanese Patent Application Laid-Open Publication No. 2005-348178

SUMMARY OF THE INVENTION

Problems to be Solved by the Invention

According to the invention of Patent Document if an image in which the degree of shaking is lowered emerges, the image is to be displayed, even if a subject of the image is different front a subject of an image that appears before a big shake occurs. However, in the case of a medical image recording/playback device, there is a need, to consistently display a treatment target, location without displaying an image that is taken away from the treatment target location.

In view of the above points, the object of the present invention is to provide a medical image recording/playback device that detects whether or not a captured, image is out of a target object and which reliably displays, when the captured image is on the target object, this image even if the degree of shaking is large.

Means for Solving the Problems

To solve the above problems, a medical image recording/playback device that shoots by putting, on a body of an operator conducting medical treatment, an image pickup device that includes at least an optical lens and an image pickup element which generates an image pickup signal by photoelectrically converting light introduced from a subject via the optical lens during shooting, includes: an image pickup control unit that controls in such a way as to display, on a display unit, a video from image data that is generated for each of frames that constitute the video based on the image pickup signal; an information recording unit that sequentially records the image data; a playback control unit that reside image data recorded on the information recording unit during playback and displays the image data on the display unit; and an image shift detection unit that sequentially compares the image data between the consecutive or adjacent frames read by the playback control unit, detects an amount of positional shift of a main subject from a positional shift of the main subject between the frames, and compares the amount of positional shift with a preset threshold value, wherein the playback control unit stops displaying of the image data read from the information recording unit after the amount of positional shift becomes greater than or equal to the threshold value, and, when the image shift detection unit detects that the main subject of the image data read by the playback control unit comes to resemble the main subject that appears before the amount of positional shift becomes greater than or equal to the threshold value, the playback control unit resumes the displaying of the image data read from the information recording unit on the display unit.

At this time, the playback control unit controls, during a period in which displaying of the image data read from the information recording unit is stopped, in such a way as to display, on the display unit as a still image, image data that appears before the amount of positional shift becomes greater than or equal to the threshold value. As a result, the images are displayed seamlessly, thereby preventing a viewer from feeling uncomfortable.

Moreover, the medical image recording/playback device further includes: a movement detection unit that calculates an amount of movement of the image pickup device during shooting; and a camera shake correction unit that corrects, when the amount of movement is greater than or equal to a second threshold value that is smaller than the threshold value, the image data in accordance with the amount of movement. Therefore, it is possible to improve the quality of the captured images.

At this time, the movement detection unit calculates the amount of movement based on a detection signal supplied from an acceleration sensor.

The movement detection unit may sequentially compare the image data between the frames, and calculate an amount of movement of the image pickup device from an amount of positional shift of a main subject between the frames.

Advantages of the Invention

The medical image recording/playback device of the present invention does not display, when a main subject of an image that is generated for each of frames that constitute a video is out of a target object, this image during playback. Therefore, during shooting, even if an operator shifts from a posture for directing the image pickup device at a target object to a posture for facing other things, the operator does not have to turn off the shooting every time. All that is required is for the operator to wear the image pickup device.

Even when an image is significantly blurred due to shaking during shooting, the image at that time is recorded. The blurred image is displayed during playback as long as the image is on the target object. Therefore, an important image is recorded even when the image is blurred, and a user does not miss out on viewing the image.

BEST MODE FOR CARRYING OUT THE INVENTION

Hereinafter, optimal embodiments of the present invention will be described with reference to the accompanying drawings.

Figure 1:
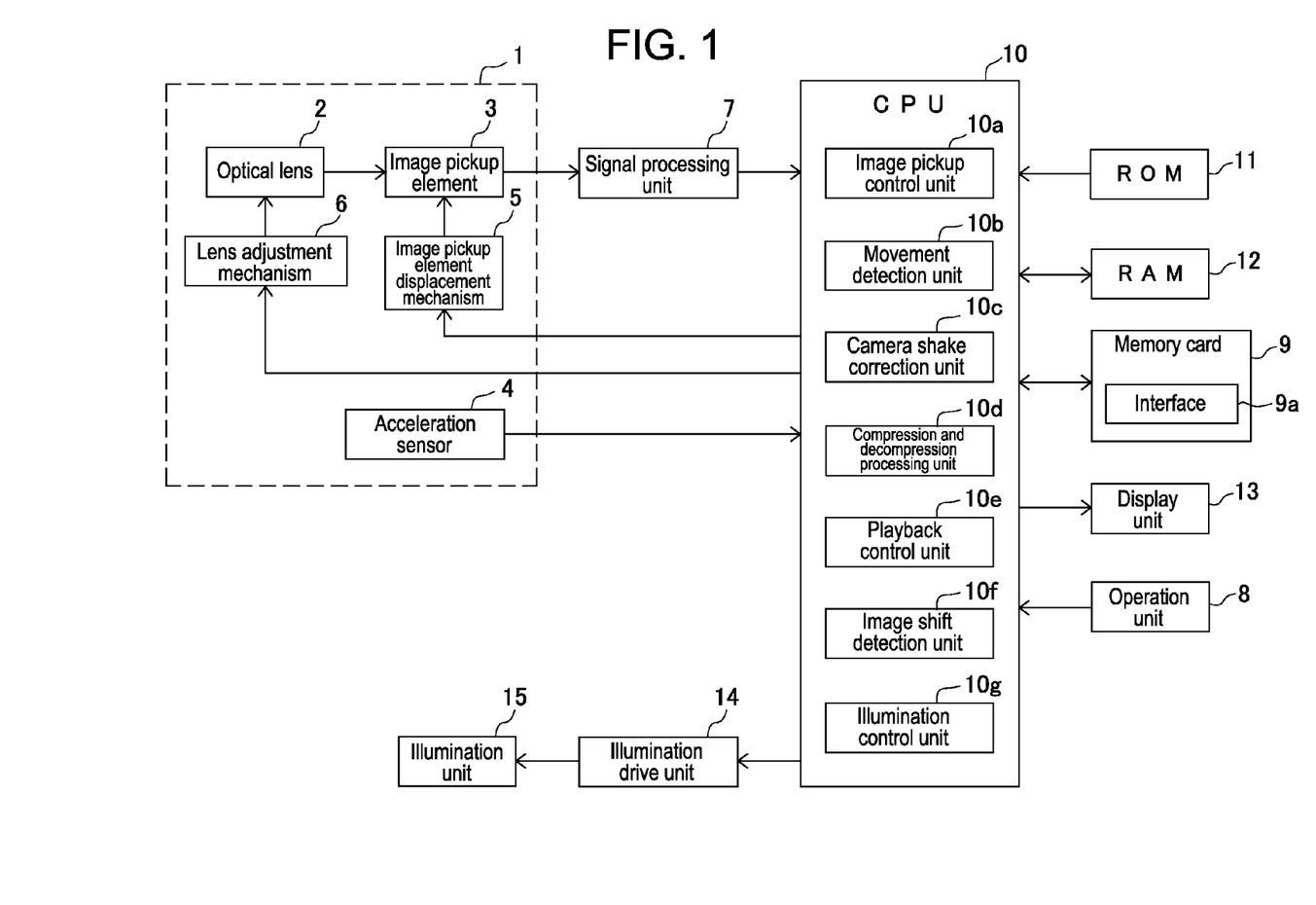
FIG. 1 is a diagram showing, as blocks, the configuration of a medical image recording/playback, device according to an embodiment of the present invention.

FIG. 1 is a block diagram showing the schematic configuration of a medical image recording/playback device according to a first embodiment of the present invention.

An image pickup device 1 is a digital video camera that shoots a video. The image pickup device 1 includes an optical lens 2, which allows light to enter from a subject during shooting; an image pickup element 3, which includes CCD or CMOS to generate image signals by photoelectrically converting the reflected light coming from the subject via the optical lens 2 into analog electric signals; an acceleration sensor 4; an image pickup element displacement mechanism 5; and a lens adjustment mechanism 6.

The acceleration sensor 4 detects a "camera shake". For example, a three-axis type is used. The acceleration sensor 4 detects, as acceleration, angular velocities of movements in three-axis directions of X, Y, and Z, which are perpendicular to each other with the axis of the operator's neck, as center. After carrying out such processes as A/D conversion, the acceleration sensor 4 outputs a detected signal to CPU 10.

The image pickup element displacement mechanism 5 corrects the video that is blurred, by the "camera shake" by moving the image pickup element 3 based, on an amount of movement of the image pickup device 1, which is calculated by a movement detection unit 10b described later.

The lens adjustment mechanism 6 uses a built-in drive motor to move the optical lens 2, thereby carrying out focusing and zooming. Incidentally, although not shown in the diagram, the optical lens 2 includes a diaphragm mechanism; the aperture is adjusted by driving of the drive motor, thereby adjusting the intensity of the subject light entering the image pickup element 3.

A signal processing unit 7 amplifies an image signal that is input from the image pickup element 3, converts the image signal into a digital signal, and outputs the digital signal to the CPU 10. In the medical image recording/playback device of the present embodiment, the video of a subject is shot at a rate of 30 frames per second, for example. Therefore, the signal processing unit 7 generates image data of each frame, and outputs the image data to the CPU 10. The function of generating image data of each frame may belong to the CPU 10.

An operation unit 8 includes a power switch, which is used to turn ON/OFF the supply of power to the image pickup device 1, a release switch, which starts the shooting of video, and a zoom switch, which is used to conduct a zooming operation of the optical lens 2.

A memory card 9, which is used as an information recording unit, records image files of the video transmitted from the CPU 10 via an interface 9*a* and outputs the recorded image files to the CPU 10. The image files are recorded in Motion JPEG format. The images of each frame are compressed in JPEG and successively combined. The information recording unit can use not only a memory card but also various recording media, such as various disc or memory types.

A display unit 13 includes a display panel 13*a* (FIG. 5), which is a liquid crystal panel or an organic EL panel. The display unit 13 displays the video shot by the image pickup device 1. The display unit 13 is also used to play and display the video of image files stored in the memory card 9.

An illumination unit 15 is used to secure the brightness of a treatment target location (subject). For example, the illumination unit 15 includes a plurality of LED elements that emit the light of each color. The illumination unit 15 is supplied with drive power from an illumination drive unit 14. In this case, it is preferred to avoid blue LED elements of a 400 nm to 500 nm band, which is said to hurt eyes.

RAM 12 is SDRAM, which is capable of high-speed reading and writing of data, for example. On the RAM 12, the image data output from the signal processing unit 7, and data being processed by the CPU are temporarily recorded.

The CPU 10 controls operation of a medical image recording/playback device based on control programs and various setting data, which are written to the ROM 11, and how each of the various switches of the operation unit 8 is operated. By executing the control programs, the CPU 10 functions as: an image pickup control unit 10*a*; a movement detection unit 10*b*, which calculates an amount of movement of the optical lens 2 or image pickup element 3; a camera shake correction unit 10*c*; a compression and decompression processing unit 10*d*; a playback control unit 10*e*; an image shift detection unit 10*f*; an illumination control unit 10*g*; and the like.

Each control function of the CPU 10 will be described.

The image pickup control unit 10*a* controls, based on a switch operation of the operation unit 8, the driving of a motor contained in the lens adjustment mechanism 6 to carry out an auto focus process, a zooming process, and an exposure adjustment process, thereby controlling the shooting of a video of a subject by the image pickup device 1. The image pickup control unit 10*a* also performs image processing, such as white balance adjustment, color interpolation processing, and aberration correction processing, on the image data of each frame transmitted from the signal processing unit 7.

The movement detection unit 10*b* calculates, from acceleration components of X, Y, and Z that are output from the acceleration sensor 4, the amounts of movement of the image pickup device 1 in a left-right direction (X-direction), an up-down direction (Y-direction), and a front-back direction (Z-direction).

The camera shake correction unit 10*c* carries out control in such a way as to correct a camera shake by operating the image pickup element displacement mechanism 5 based on the amounts of movement calculated by the movement detection unit 10*b*.

The compression and decompression processing unit 10*d* compresses, in JPEG, the image data of each frame loaded onto the RAM 12, thereby generating an image file of the video to be recorded on the memory card 9. When the video of an image file recorded on the memory card 9 is played, the compression and decompression processing unit 10*d* decompresses the compressed image data.

The playback control unit 10*e* reads images stored in the memory card 9 to display the images on the display unit 13.

An image shift detection unit 10*f* uses pattern matching or any other method to sequentially compare the image data between consecutive or adjacent frames of video read by the playback control unit 10*e*, thereby recognizing a main subject. Moreover, the image shift detection unit 10*f* calculates a value of positional shift in the vertical and horizontal directions on X-Y axes of a main subject in each of images between frames that are adjacent to each other or in each of images between frames that are close to each other. Then, after the calculated, positional-shift value exceeds a preset threshold value, it is then determined that a main subject has changed in consecutive images. That is, it is determined that the image has shifted from the treatment target location to other locations.

The illumination control unit 10*g* outputs a control signal to the illumination drive unit 14 in order to supply drive power to the illumination unit 15 and control the amount of current thereof.

Figure 2:
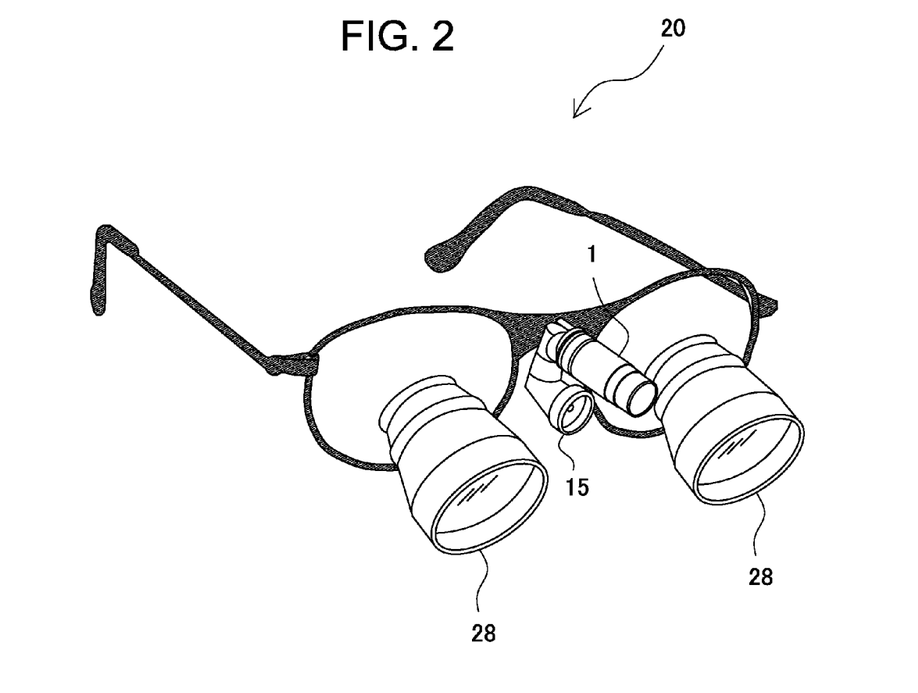
FIG. 2 is an explanatory diagram of a binocular loupe that includes an image pickup device and an illumination unit.
Figure 3:
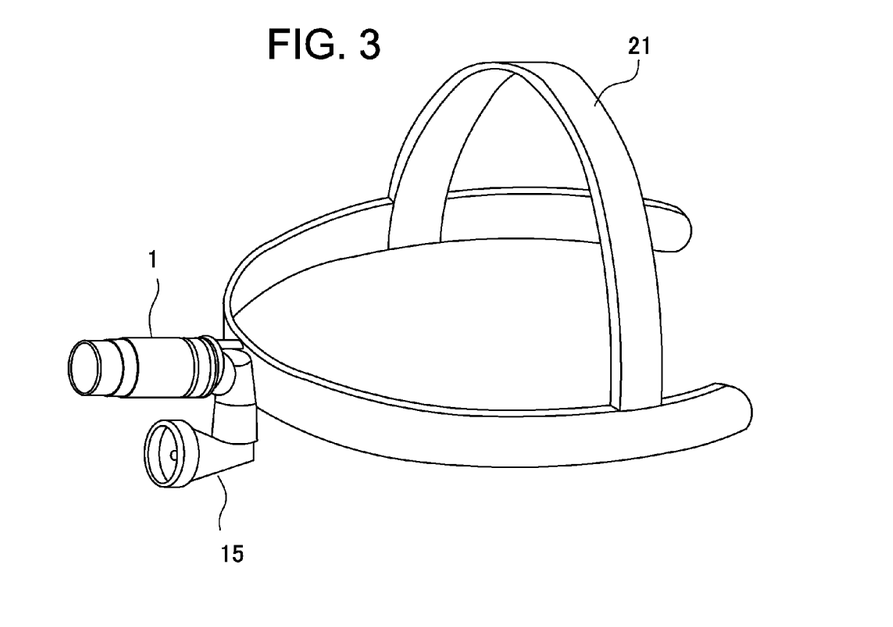
FIG. 3 is an explanatory diagram of a head band that includes an image pickup device and an illumination unit.

An example of how the image pickup device 1 is put on the body of an operator will be described. In the example shown in FIG. 2, the image pickup device 1 and the illumination unit 15, which casts light on a subject, are attached to a binocular loupe 20 that an operator puts on his/her face when conducting treatment. Instead of the binocular loupe 20, a cap or a headband may be used. FIG. 3 shows a headband 21 to which the image pickup device 1 and the illumination unit 15 have been attached. The headband 21 is made of a resin member; the headband 21 is kept and fixed on the head of an operator due to the elasticity thereof. The headband 21 is not limited to this configuration. The headband 21 may be made of cloth, rubber, or the like, and can be made in various forms.

Figure 4:
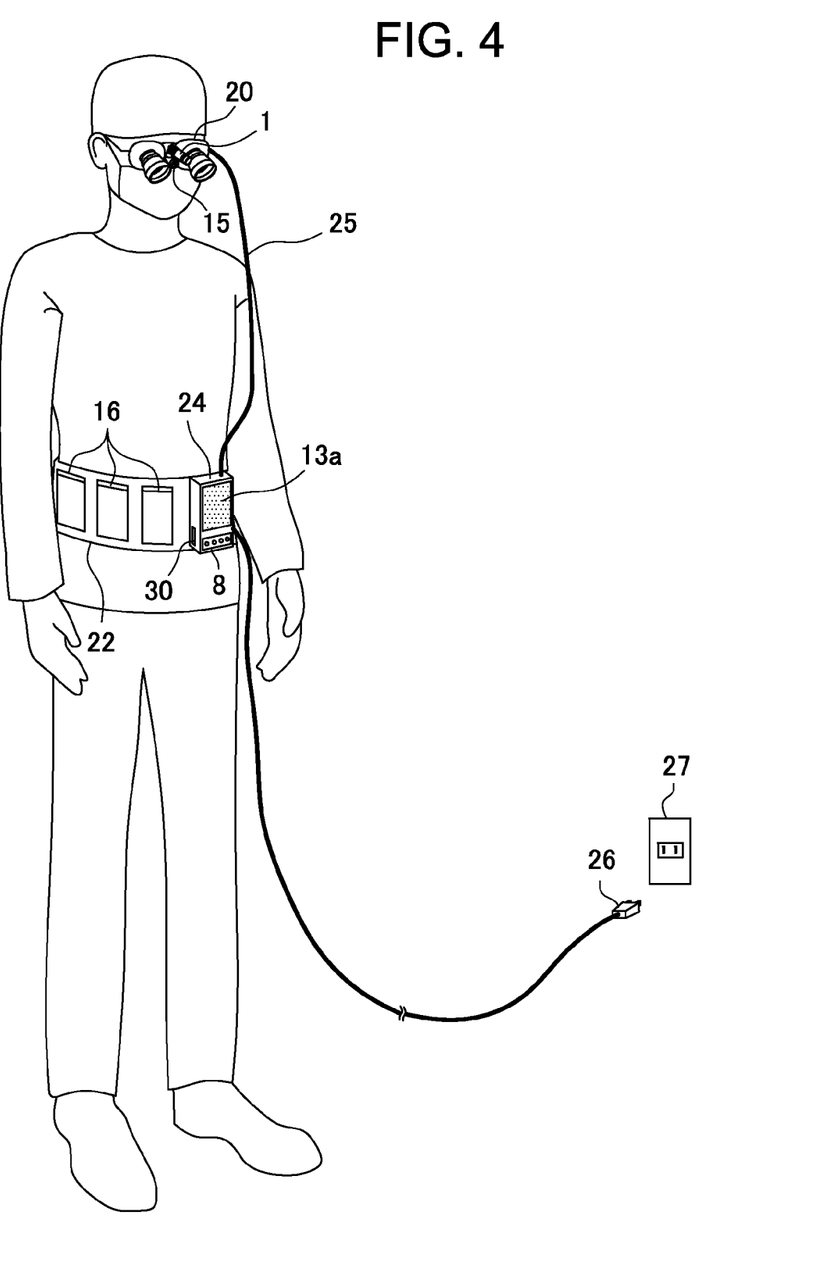
FIG. 4 is an explanatory diagram showing an example in which a medical image recording device of an embodiment of the present invention is put on an operator.
Figure 5:
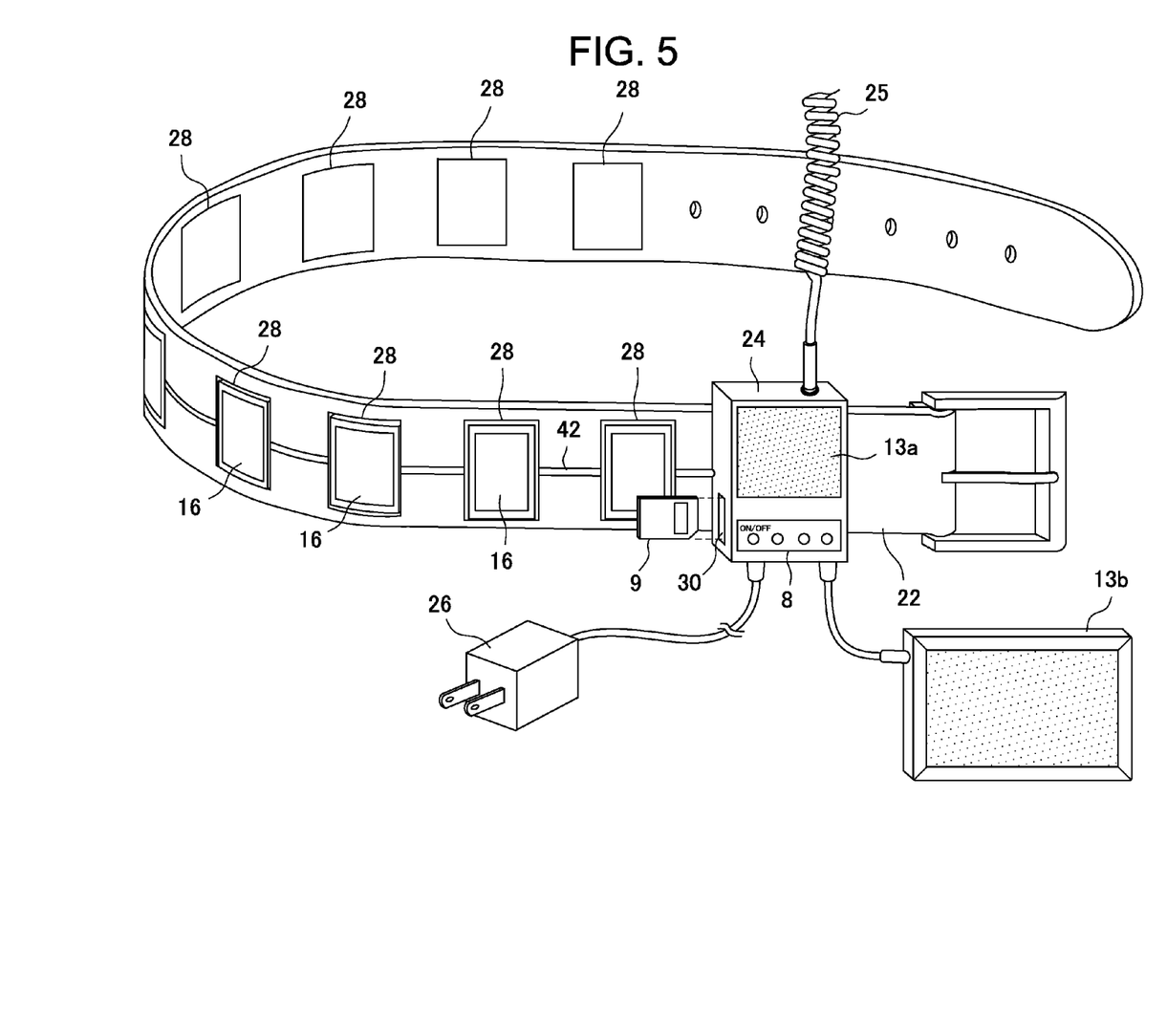
FIG. 5 is an explanatory diagram showing a control unit of a medical image recording/playback device of an embodiment of the present invention.
Figure 6:
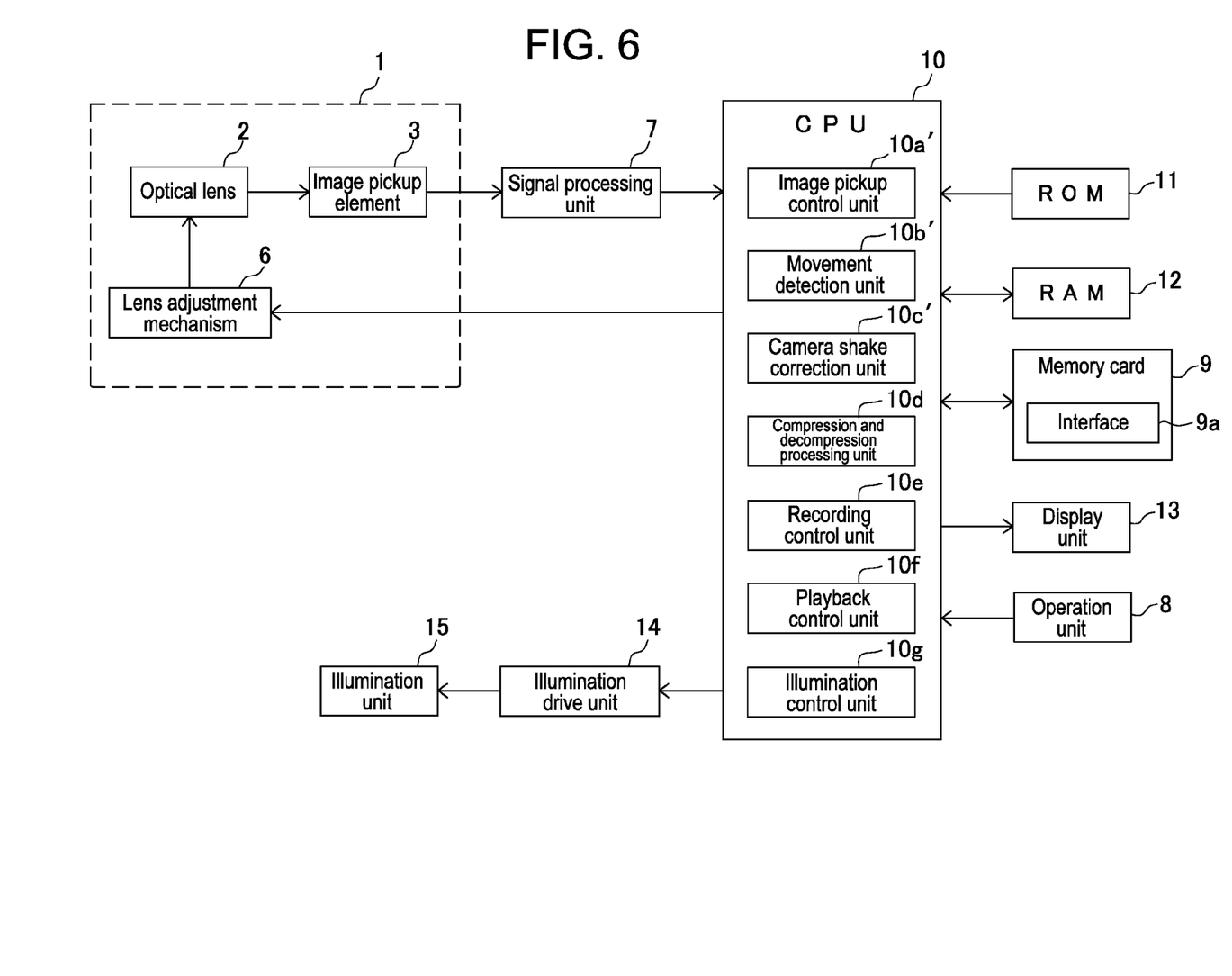
FIG. 6 is a diagram showing, as blocks, electric circuits of a medical image recording/playback, device according to a third embodiment of the present invention.

As shown in FIGS. 4 and 5, the operator wraps a battery holding belt 22 around his/her waist; a battery power source is held by the battery holding belt 22 as an operation power source for this medical image recording/playback device. The battery power source includes a plurality of rechargeable batteries 16, which are connected to each other. The battery holding belt 22 includes mounting sections 28 into which the batteries 16 are inserted in a detachable manner. On the battery holding belt 22, a control unit 24 is mounted along with the batteries 16. The batteries 16 are connected to the control unit 24.

On the surface of a unit casing of the control unit 24, the operation unit 8 and the display panel 13*a* of the display unit 13, which is a liquid crystal panel or an organic EL panel, are disposed. The display panel 13*a* is used as a monitor screen for captured images. Another display panel 13*b* is provided so that nearby people, such as treatment assistants, can monitor how the treatment is going on. In this case, if signals of the image data are transmitted wirelessly from the control unit 24 to the display panel 13*a*, the operator can move freely during the treatment.

If a Wi-Fi network camera is used as the image pickup device 1, the video can be fed to a terminal device with a display panel 13*b* via the internet so that the monitoring is possible. In this case, in the terminal device, the URL of the network camera is specified on a WEB browser. Therefore, the terminal device can take in the images captured by the network camera of how the treatment is being carried out via the internet in real time. In this manner, the upside of using a wireless LAN is that the treatment can be monitored in real time through terminal devices at any locations other than where the treatment is carried out.

On a side surface of the unit casing, a slot 30, into which the memory card 9 is inserted in a detachable manner, is formed. A control board on which the CPU 10, the ROM 11, the RAM 12, the signal processing unit 7, and the display unit 13 are mounted is housed inside the unit casing.

A cable harness 25 is a bundle of: a power cord, which supplies drive current from the control unit 24 to the image pickup device 1 and the illumination unit 15; signal lines of control signals, which are output from the CPU 10 to the image pickup element displacement mechanism 5 and the lens adjustment mechanism 6; and an input signal line, which extends from the acceleration sensor 4 to the CPU 10.

If a charger 26 whose plug is plugged into an electrical outlet 27 is connected to the control unit 24, the image pickup device 1 and the illumination unit 15 can be used to carry out a shooting operation and an illumination operation when the batteries 16 are being charged. Therefore, the video can be shot even during a prolonged treatment.

The operation of the above medical image recording/playback, device will be described. When the operation unit 8 of the control unit 24 is operated to turn the medical image recording/playback device ON, the CPU 10 loads the control programs onto the ROM 11 to initiate the operation of the medical image recording/playback device. At this time, if the operator directs his/her face at a subject or a treatment target location, the image pickup control unit 10*a* carries out an auto focus process and an exposure adjustment process for the subject. When a zooming switch of the operation unit 8 is operated, the image pickup control unit 10*a* adjusts the zooming of the optical lens 2. The illumination control unit 10*g* controls the illumination drive unit 14 and turns the illumination unit 15 ON by supplying drive current to the illumination unit 15 in such a way that a normal level of brightness is secured.

When the release switch of the operation unit 8 is operated, the image pickup control unit 10*a* starts to shoot a video. The image pickup control unit 10*a* sequentially takes in image data of each frame from the signal processing unit 7 to store the image data in the RAM 12, and carries out image processing, such as white balance adjustment, color interpolation processing, and aberration correction processing, on the stored image data. Then, the image pickup control unit 10*a* sequentially reads the image data that is stored in the RAM 12 and has undergone the image processing, and outputs the image data to the display unit 13. The video is displayed on the display unit 13 as a result. As described above, the signal processing unit 7's function to sequentially generate the image data of each frame may be realized by the CPU 10 that executes the control programs of the ROM 11.

The compression and decompression processing unit 10*d* compresses the image data in JPEG after the image data, stored in the RAM 12, underwent the image processing. The compressed image data is transmitted to the memory card 9 and recorded in an image file of the video.

Figures 7A, 7B:
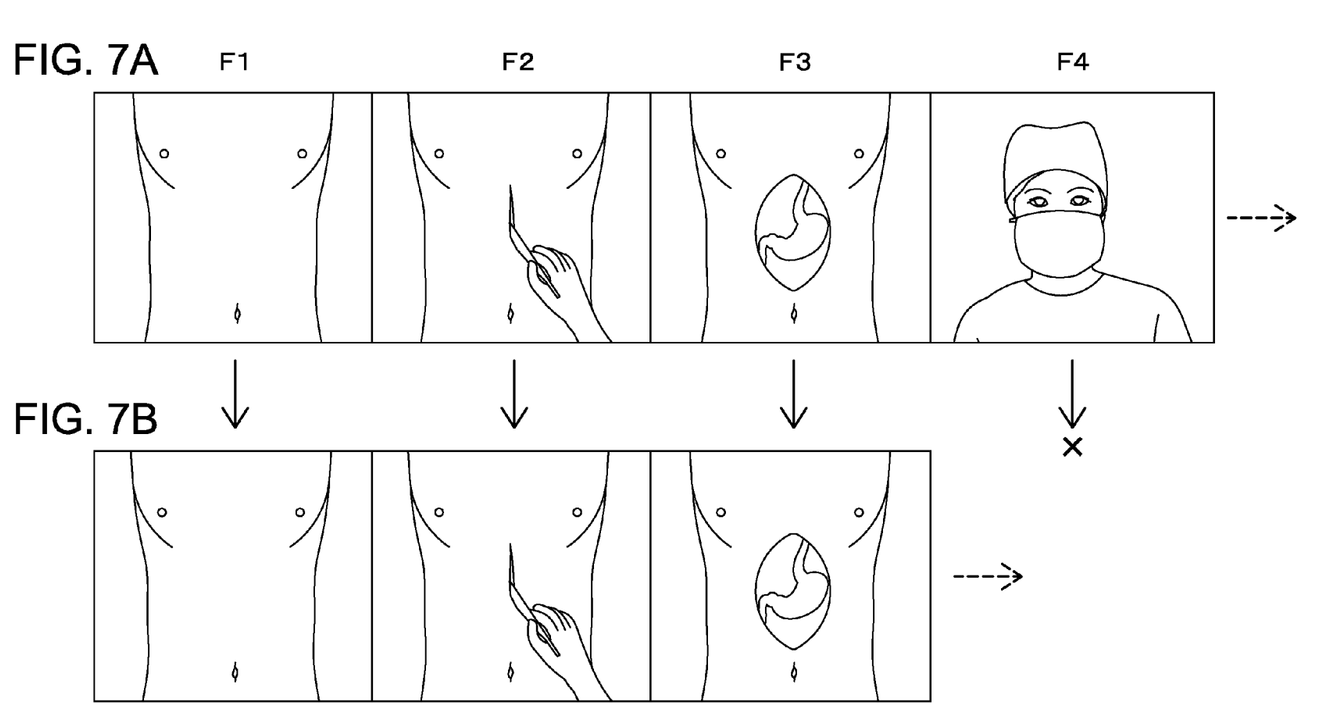
FIG. 7A is an explanatory diagram schematically showing an image of each frame in a medical image recording/playback, device according to the first and second embodiments of the present invention.
FIG. 7B is an explanatory diagram schematically showing image data recorded on a memory card.
Figure 8A:
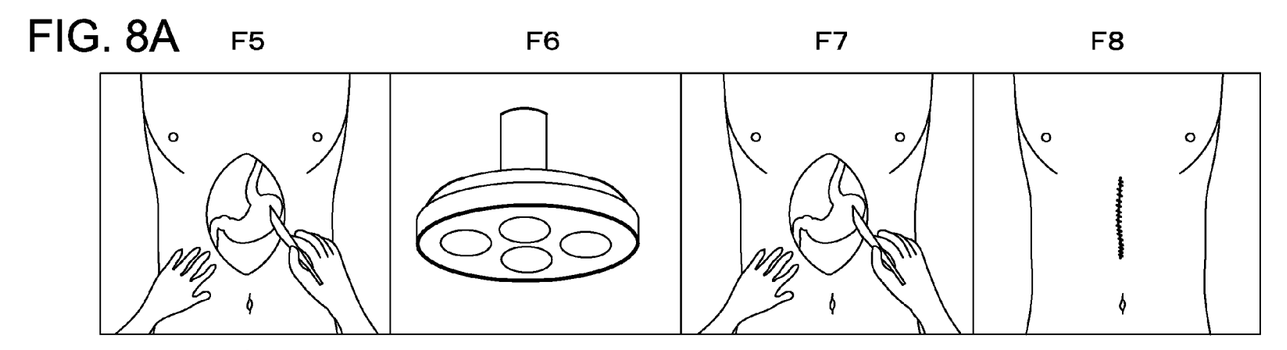
FIG. 8A is an explanatory diagram schematically showing an image of each frame that comes after those of FIGS. 7A and 7B in a medical image recording/playback device according to the first and second embodiments of the present invention.

FIGS. 7A and 8A schematically show images of image data whose each frame is taken into the image pickup control unit 10*a* from the signal processing unit 7, when image signals of images taken by the image pickup device 1 that is put on the head via the above binocular loupe 20 or headband 21 are output to the signal processing unit 7 during treatment by the operator. The image pickup control unit 10*a* actually takes in the image data at a rate of 30 frames per second, in order to shoot a video via the image pickup device 1. For ease of explanation, in the case of FIGS. 7A and 8A, a series of images during the treatment is simplified in such a way as to only show images of representative frames. A series of images in FIGS. 7A and 8A are also images that are recorded on the memory card 9.

The image pickup control unit 10*a* takes in the image data of each frame from the signal processing unit 7, and stores the image data in the RAM 12 without any change. The image pickup control unit 10*a* then carries out image processing, such as white balance adjustment, color interpolation processing, and aberration correction processing. Then, the image pickup control unit 10*a* sequentially reads the image data that is stored in the RAM 12 and has undergone the image processing, and outputs the image data to the display unit 13. The video is displayed on the display unit 13 as a result.

The compression and decompression processing unit 10*d* compresses, in JPEG, each set of the image data sequentially stored in the RAM 12. The compressed image data is transmitted to the memory card 9 and recorded in an image file.

If the acceleration sensor 4 detects the movement of the head of the operator during the shooting of the video, the movement detection unit 10*b* calculates, from angular velocities of X, Y, and Z that are output from the acceleration sensor 4, the amounts of movement of the image pickup device 1 in the left-right direction (X-direction), the up-down direction (Y-direction), and the front-back direction (Z-direction). In an edge portion of a signal that the acceleration sensor 4 outputs after detecting an angular velocity, distortion, such as ringing or overshooting/undershooting, occurs. Accordingly, the movement detection unit 10*b* takes into account in advance a period during which the distortion will attenuate in the edge portion of the angular-velocity detection signal, in setting a delay time; the movement detection unit 10*b* therefore calculates the amounts of movement of the image pickup device 1 after the delay time has passed.

Then, the movement detection unit 10*b* compares the values of the amounts of movement calculated with a preset shake judgment threshold value. The shake judgment threshold value is a criterion for determining whether a blur detected, by the acceleration sensor 4 is a degree of movement that is unlikely to affect the quality of the captured images. If the values of the amounts of movement exceed the preset shake judgment threshold value after the shooting direction of the image pickup device 1 moves significantly from the subject (treatment target location), the movement detection unit 10*b* then judges that a "camera shake" has occurred.

If the movement detection unit 10*b* judges the values of the amounts of movement calculated to be a "camera shake", the movement detection unit 10*b* controls the image pickup element displacement mechanism 5 to move, based on the amounts of movement calculated by the movement detection unit 10*b* at that time, the image pickup element 3 in a direction of cancelling the blur. For example, when the image pickup device 1 is causing a blur in the right direction, the camera shake correction unit 10*c* controls the image pickup element displacement mechanism 5 to move the image pickup element 3 in the left direction by an amount equivalent to the amount of movement. Therefore, the signal processing unit 7 can generate the same image data as when no "camera shake" has occurred. Accordingly, in the image data of each frame that the signal processing unit 7 outputs to the image pickup control unit 10*a*, a "camera shake" has been corrected. Incidentally, if a "camera shake" is to be mechanically corrected, a correction lens is incorporated into the optical lens 2, and the correction lens is moved by the same amount that the image pickup device 1 has moved in a direction of cancelling the blur. In this manner, a camera shake correction mechanism that corrects an optical axis may be used.

For example, if the operator directs his/her face toward an assistant by suspending the treatment in order to give the treatment assistant instructions during the shooting by the image pickup device 1, the image pickup device 1 then captures an image of the assistant, and the image pickup control unit 10*a* takes in a frame of image F4 from the signal processing unit 7. Accordingly, if the shooting has moved away from the treatment target location, a record of the shooting is recorded on the memory card 9.

When the movement detection unit 10*b* judges that the shooting direction of the image pickup device 1 has moved away from the treatment target location, the illumination control unit 10*g* controls the illumination drive unit 14 to halt the supply of power to the illumination unit 15 or reduce the current supplied to the illumination unit 15. Therefore, during the suspension of the treatment, it is possible to prevent the batteries 16 from being consumed by the illumination.

As the operator directs his/her face at the treatment target location again, the acceleration sensor 4 detects the angular velocity of the image pickup device 1 moving toward the treatment target location. As a result, the movement detection unit 10*b* judges that the treatment has been restarted. Therefore, the illumination control unit 10*g* controls the illumination drive unit 14 to restart the supply of power to the illumination unit 15 or bring the amount of current supplied to the illumination unit 15 back to a normal level.

When the operator turns his/her face to a ceiling light during the treatment, then the image pickup device 1 takes image F6 (FIG. 8A). The image F6 is stored, in the RAM 12 by the image pickup control, unit 10*a*, and the image F6 is recorded on the memory card 9 by the recording control unit 10*e*. Similarly, the illumination control unit 10*g* controls the illumination unit 15 in such a way as to turn the illumination unit 15 OFF or lower the illumination intensity.

As the operator's face move back to the treatment target location, the images F7 and F8 that the image pickup control unit 10*a* receives from the signal processing unit 7 are recorded on the memory card 9 and displayed on the display unit 13. The illumination control unit 10*g* brings the illumination unit 15 back to normal conditions.

In that manner, if the amount of movement that the movement detection unit 10*b* calculates from an angular velocity detected by the acceleration sensor 4 exceeds the shake judgment threshold value, the camera shake correction unit 10*c* makes a correction, and the image pickup control unit 10*a* displays, on the display unit 13, an image of image data that is stored in the RAM 12 and has undergone the image processing, such as white balance adjustment, and also records the image on the memory card 9. Even if the shooting target moves away from a shooting target location after the image pickup device 1 is moved significantly, the image at that time is recorded on the memory card 9.

An operation of playing an image file recorded, on the memory card 9 will be described. The image file contains a captured image that is different from a shooting target location because the image pickup device 1 has moved significantly.

Figure 8B:
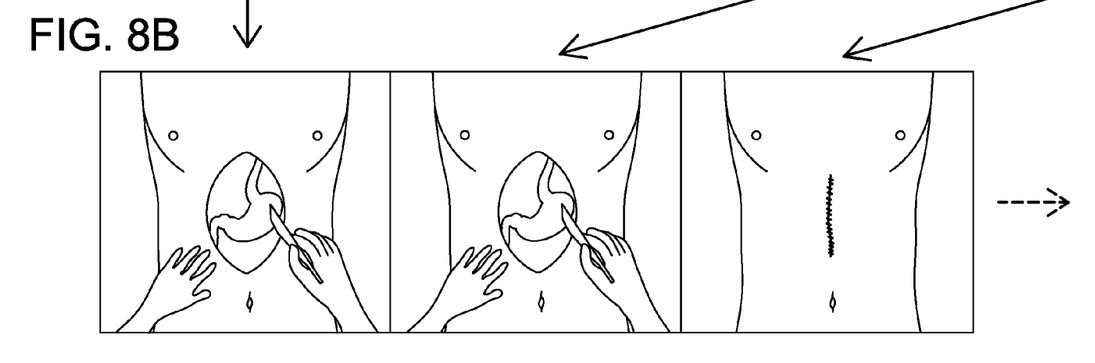
FIG. 8B is an explanatory diagram schematically showing image data recorded on a memory card.

In playback mode, the playback control unit 10*e* plays video by sequentially displaying, on the display panel 13*a*, image data that is read from the memory card 9. At this time, the playback control unit 10*e* outputs image signals to a personal, computer or the like in order to play the video on a display panel 13*b*, which is different from the display panel 13*a*. FIG. 7B and FIG. 8B schematically show images that are displayed during playback.

At this time, the image shift detection unit 10*f* detects an amount of positional shift of a main subject in each set of image data of consecutive or adjacent frames read by the playback control, unit 10*e*. When the image shift detection unit 10*f* judges that the amount of positional shift of the main subject is greater than or equal to a preset threshold value, the playback control unit 10*e* stops displaying of image data that are read, from the memory card 9 afterward, on the display unit. The playback control unit 10*e* displays, on the display unit 13 as a still image, an image of image data that has been played immediately before the judgment.

In this case, the image shift detection unit 10*f* sequentially analyzes each of images between frames that are adjacent to each other at intervals of 1/30 seconds, or each of images between frames that are close to each other, for example, at intervals of 1/3 seconds, and recognizes a common portion as at main subject. The main subject is gradually changing as the treatment proceeds. Therefore, for example, at the time when the image F3 appears, the image shift detection unit 10*f* recognizes an organ exposed by opening of the abdomen as a main subject, which is significantly different from the main subject recognized, when the image F1 appears. However, when the previous and subsequent frames are compared with one another the main subject does not change significantly.

However, at the time when the image shift detection unit 10*f* processes image data of the image F4, the main subject changes significantly. Therefore, the amount of positional shift of the main subject is greater than, or equal to a preset threshold value, and the image shift detection unit 10*f* judges that the video is out of the treatment target location. As a result, the playback control unit 10*e* does not display the image on the display unit 13, and instead continues displaying an image that is displayed immediately before the judgment as shown in FIG. 7B. Therefore, a still image is displayed.

Even after the image shift detection unit 10*f* judges that the video is out of the treatment target location, the image shift detection unit 10*f* keeps recognizing a main subject by carrying out a pattern matching process of image data that the playback control unit 10*e* reads from the memory card 9. When the image shift detection unit 10*f* detects that a recognized main subject resembles the original main subject (i.e. treatment target location), the image shift detection unit 10*f* recognizes that a record video has returned, to the treatment target location, and the playback control unit 10*e* resumes displaying of the video by displaying the image data on the display unit 13. After that, if the image shift detection unit 10*f* judges, when processing the image data of the image F6, that the video is out of the treatment target location, the playback control unit 10*e* does not play and display the image F6 as shown in FIG. 8B.

In this manner, during shooting, the recording of images on the memory card 9 is not stopped depending on a change of the main subject. During playback, only a necessary treatment target location is displayed. Accordingly, even if an image is blurred by shaking of the body of the operator during treatment, the image is faithfully played and displayed as long as the image captures the treatment target location.

In the above-described embodiment, the movement detection unit 10b detects a "camera shake" based on acceleration output from the acceleration sensor 4. However, the movement detection unit 10b may detect a "camera shake" by using the same pattern matching method as that of the image shift detection unit 10f. In this case, the movement detection unit 10b and the camera shake correction unit 10c carries out control as described below.

First, the movement detection unit 10b analyzes images of image data between consecutive or adjacent frames that the image pickup control unit 10a takes in from the signal processing unit 7, extracts the contours of the subject as feature points, and recognizes an area where the feature points overlap with one another as a main subject. In this case, each of images between frames that are adjacent to each other at intervals of 1/30 seconds, or each of images between frames that are close to each other, for example, at intervals of 1/3 seconds, is sequentially analyzed, and a common portion is recognized, as a main subject. The movement detection unit 10b calculates a value of positional shift in the vertical and horizontal directions on X-Y axes of a main subject in each of images between frames that are adjacent to each other or in each of images between frames that are close to each other. When the calculated positional-shift value is greater than a second threshold, value, it is determined that a "camera shake" has occurred. The second, threshold value is set to a smaller value than the threshold value that is used to determine whether the main subject has sifted significantly. Accordingly, when the main subject has not changed but there is a noticeable positional shift of the main subject between the previous and subsequent images, it is determined that a "camera shake" has occurred.

After the movement detection unit 10b judges that a "camera shake" has occurred, the camera shake correction unit 10c controls the image pickup element displacement mechanism 5 in such a way as to move the image pickup element 3 in a camera shake direction by an amount equivalent to the amount of movement. Therefore, the signal processing unit 7 can generate the same image data as when no "camera shake" has occurred.

The way a "camera shake" is corrected is not limited to such optical processing. A "camera shake" may be corrected by generating a synthetic image from images of two consecutive or adjacent frames at a time when the amount of movement calculated by the movement detection unit 10b is greater than a threshold value for identifying a "camera shake" and storing data of the synthetic image in the RAM 12.

While the present invention has been described in detail, the present invention is not limited to the above embodiments. Various modifications may be made based on the spirit of the present invention, and those modifications will not be excluded from the scope of the present invention.

INDUSTRIAL APPLICABILITY

The present invention relates to a medical image recording/playback, device that shoots and records progress of treatment by using an image pickup device put on the body of an operator and plays and displays only an image capturing a treatment target location during playback. The present invention has industrial applicability.

EXPLANATION OF REFERENCE SYMBOLS

1: Image pickup device
2: Optical lens
3: Image pickup element
4: Acceleration sensor
7: Signal processing unit
9: Memory card (information recording unit)
10: CPU
10a: Image pickup control unit
10b: Movement detection unit
10c: Camera shake correction unit
10e: Playback control unit
10f: Image shift detection unit
13: Display unit

The invention claimed is:

1. A medical image recording/playback device that shoots by putting, on a body of an operator conducting medical treatment, an image pickup device that includes at least an optical lens and an image pickup element which generates an image pickup signal by photoelectrically converting light introduced from a subject via the optical lens during shooting, the medical image recording/playback device comprising:
    an image pickup control unit that controls in such a way as to display, on a display unit, a video from image data that is generated for each of frames that constitute the video based on the image pickup signal;
    an information recording unit that sequentially records the image data;
    a playback control unit that reads image data recorded on the information recording unit during playback and displays the image data on the display unit; and
    an image shift detection unit that sequentially compares the image data between the consecutive or adjacent frames read by the playback control unit, detects an amount of positional shift of a main subject from a positional shift of the main subject between the frames, and compares the amount of positional shift with a preset threshold value, wherein
    the playback control unit stops displaying of the image data read from the information recording unit after the amount of positional shift becomes greater than or equal to the threshold value, and, when the image shift detection unit detects that the main subject of the image data read by the playback control unit comes to resemble the main subject that appears before the amount of positional shift becomes greater than or equal to the threshold value, the playback control unit resumes the displaying of the image data read from the information recording unit on the display unit.

2. The medical image recording/playback device according to claim 1, wherein
    the playback control unit controls, during a period in which displaying of the image data read from the information recording unit is stopped, in such a way as to display, on the display unit as a still image, image data that appears before the amount of positional shift becomes greater than or equal to the threshold value.

3. The medical image recording/playback device according to claim 1, further comprising:
    a movement detection unit that calculates an amount of movement of the image pickup device during shooting; and a camera shake correction unit that corrects, when the amount of movement is greater than or equal to a second threshold value that is smaller than the threshold value, the image data in accordance with the amount of movement.

4. The medical image recording/playback device according to claim 3, wherein
the movement detection unit calculates the amount of movement by using an acceleration sensor.

5. The medical image recording/playback device according to claim 3, wherein
the movement detection unit sequentially compares the image data between the frames, and calculates an amount of movement of the image pickup device from an amount of positional shift of a main subject between the frames.

* * * * *